United States Patent [19]
Miya

[11] Patent Number: 5,894,786
[45] Date of Patent: Apr. 20, 1999

[54] DRIPPING APPARATUS FOR LIQUIDS

[76] Inventor: Isamu Miya, 618-1 Imai, Ohaza, Akabori-cho, Sawa-gun Gunma 379-22, Japan

[21] Appl. No.: 08/961,210

[22] Filed: Oct. 30, 1997

[51] Int. Cl.⁶ .................................................. A47J 31/06
[52] U.S. Cl. .......................... 99/306; 99/323; 210/474; 210/477
[58] Field of Search ........................... 99/306, 304, 323; 426/82, 83, 80; 210/473, 474, 477

[56]  References Cited

U.S. PATENT DOCUMENTS 4,306,492  12/1981  Zimmermann ................. 426/80 X
4,520,716  6/1985   Hayes ............................... 99/306
4,867,993  9/1989   Nordskog ....................... 426/82 X

FOREIGN PATENT DOCUMENTS 7-24226  9/1995  Japan .

*Primary Examiner*—Reginald L. Alexander
*Attorney, Agent, or Firm*—Bacon & Thomas, PLLC

[57]  ABSTRACT

A collapsible dripping apparatus for liquids having a filter holding member, a bellows member and a supporting brim member. The apparatus can be disassembled into three pieces to be made compact when the apparatus is not being used. Therefore, the apparatus can be stored or brought to someplace without occupying a large space. Further, the assembled apparatus has a fan-like shape so as to be able to drip liquid material, such as coffee and tea using a filter which is available on the market.

7 Claims, 6 Drawing Sheets

DRIPPING APPARATUS FOR LIQUIDS

BACKGROUND OF THE INVENTION

1. Field of the Invention

The present invention relates to a dripping apparatus for liquids, particularly relates to an apparatus for dripping liquid, such as coffee and tea. The apparatus according to the present invention is designed so as to be collapsible into a compact size, therefore, it is convenient for storing or carrying during when the apparatus is not used.

2. Related Art

Apparatuses for use in dripping coffee or tea are generally made of a solid material, for instance, porcelain, plastic resin, etc. Such a dripping apparatus comprises a circular shaped brim portion, which is designed so as to be suitable to place it on a coffee or tea cup or a coffee or teapot; and a filter holding portion, an upper side of which is enlarged to be fitted to the shape of a general type of filter paper. Since the conventional type of dripping apparatus for liquids has such a special shape, during when the apparatus is not being used, there is some difficulty to store it in a kitchen or carry it somewhere outside.

Various instant type of coffee or tea dripping sets have been well known which are also convenient to be carried outside. Taste of regular coffee or tea can be expected from such dripping sets. For instance, in the Japanese Utility Model Laid-open Publications No. Sho 63-166128 (1988), Hei 1-178835 (1989) and Hei 4-44836 (1992), a disposal type coffee dripping set is disclosed which comprises a coffee liquid dripping portion having a container in which some coffee powder is preliminarily prepared and a foldable bellows portion which is combined to the dripping portion.

According to conventional coffee dripping sets, a taste of regular coffee can be expected, while, the conventional coffee dripping sets have a disadvantage that the sets cannot be reused because of their construction in that the coffee liquid dripping portion containing some coffee powder and the foldable bellows are combined together as a single body. Further, since the conventional type coffee dripping apparatuses have such a construction that hot water should be directly poured into the prolonged bellows portion, the bellows are shrunk by the force of the hot water poured into the bellows portion as a practical use. That is to say, according to the conventional dripping sets, it is difficult to pour hot water into the coffee dripping apparatus effectively and safely. Furthermore, in such conventional dripping sets, since the coffee powder is preliminarily prepared in the container of the dripping apparatus, the coffee powder might deteriorate if a long time has passed after purchasing the dripping apparatus. In such a case, it is difficult to taste the flavor of regular coffee which is made just after being ground.

Furthermore, a different type of coffee dripping apparatus is also known, which is reusable and has a construction in that a thin metal string is rolled up so as to make a spiral and conical shape having an aspect point thereof at a lower side. This type of coffee dripping apparatus can be reused and can be folded to a compact size. However, the material for this apparatus is metal, for instance, stainless steel, so that the manufacturing cost for the apparatus becomes very high.

The present invention has its purpose for providing a reusable type dripping apparatus for liquids which is designed so as to be collapsible into a compact shape. According to the invention, when the dripping apparatus is stored or carried somewhere, the apparatus can be folded into a compact size, while, the apparatus can be used to drip liquid material, such as coffee or tea, easily and safely with the aid of paper filter which is widely available on the market.

SUMMARY OF THE INVENTION

In order to carry out the above-mentioned purpose, the dripping apparatus for liquids according to the present invention comprises:

a filter holding member comprises a base where at least one hole is provided for dripping a liquid material out and a pair of wing portions which are provided on both sides of said base and which are arranged to be collapsible with respect to said base;

a bellows member comprising a bottom portion where at least one hole is also provided so as to be superimposed to said hole provided in said base of the filter holding member when said filter holding member is mounted inside of the bellows member; bellows portion being capable of being prolonged; and a stand portion being provided under said bellows portion;

a supporting brim member having an opening in its center portion to mount said filter holding member and said bellows member in a detachable manner; and a securing means for securing said filter holding member and said bellows member to said supporting brim member to assemble the apparatus as a whole.

According to the dripping apparatus for liquids of the present invention, the apparatus is arranged to be collapsible by using the bellows member, while, since the apparatus comprises a filter holding member which should be provided inside of the bellows member, a filter, for instance, a paper filter which is widely available on the market, can be used to drip coffee liquid. Therefore, the dripping apparatus for liquids can be used repeatedly by only exchanging the filter.

Further, according to the invention, the filter holding member and the bellows member are arranged to be detachable to said supporting brim member; and the filter holding member and the bellows member are designed to be able to be disassembled from each other. Therefore, when the apparatus is not being used, the filter holding member, the bellows member and the supporting brim member can be disassembled from each other and these members are able to be folded separately; such an arrangement is quite convenient for storing or bringing the apparatus somewhere. Furthermore, the dripping apparatus for liquids according to the present invention is designed in such a manner that the top portions of the wing portions of the filter holding portion can be engaged with the top end portion of the bellows member under the condition that the bellows member is prolonged, so that the bellows portion is not shrunk by the force of pouring the hot water. Therefore, according to the invention, the liquid dripping procedure can be conducted in a safe and easy manner.

DETAILED EXPLANATION OF THE PREFERRED EMBODIMENTS

Figure 1:
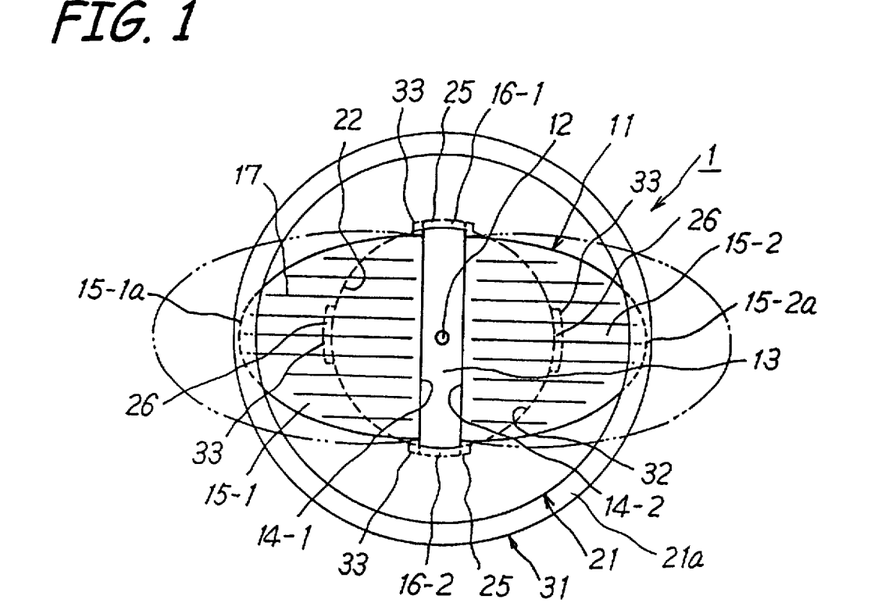
FIG. 1 is a plan view showing a construction of a first embodiment of the dripping apparatus for liquids according to the present invention.
Figure 2:
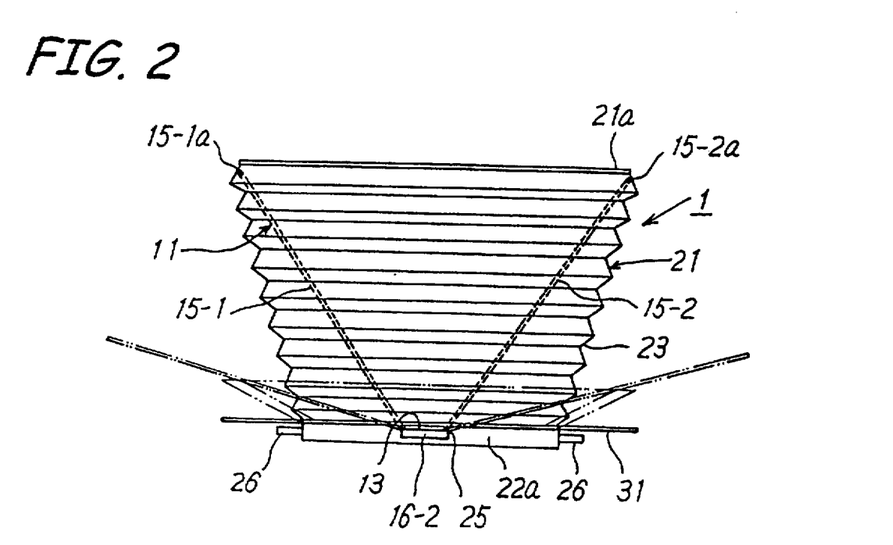
FIG. 2 is a front view depicting the dripping apparatus for liquids according to the present invention, which is shown in FIG. 1.
Figure 3:
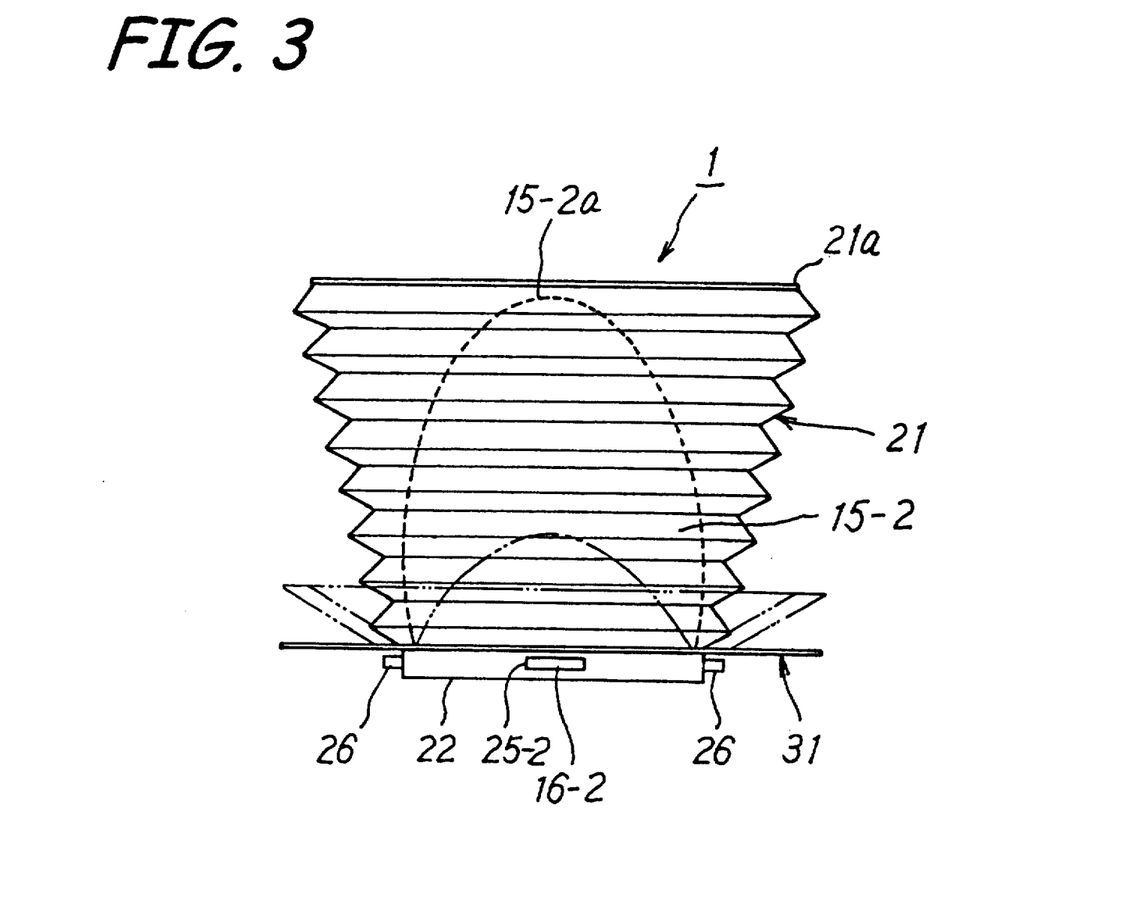
FIG. 3 is a side view illustrating the dripping apparatus for liquids according to the present invention, which is shown in FIGS. 1 and 2.
Figure 4A:
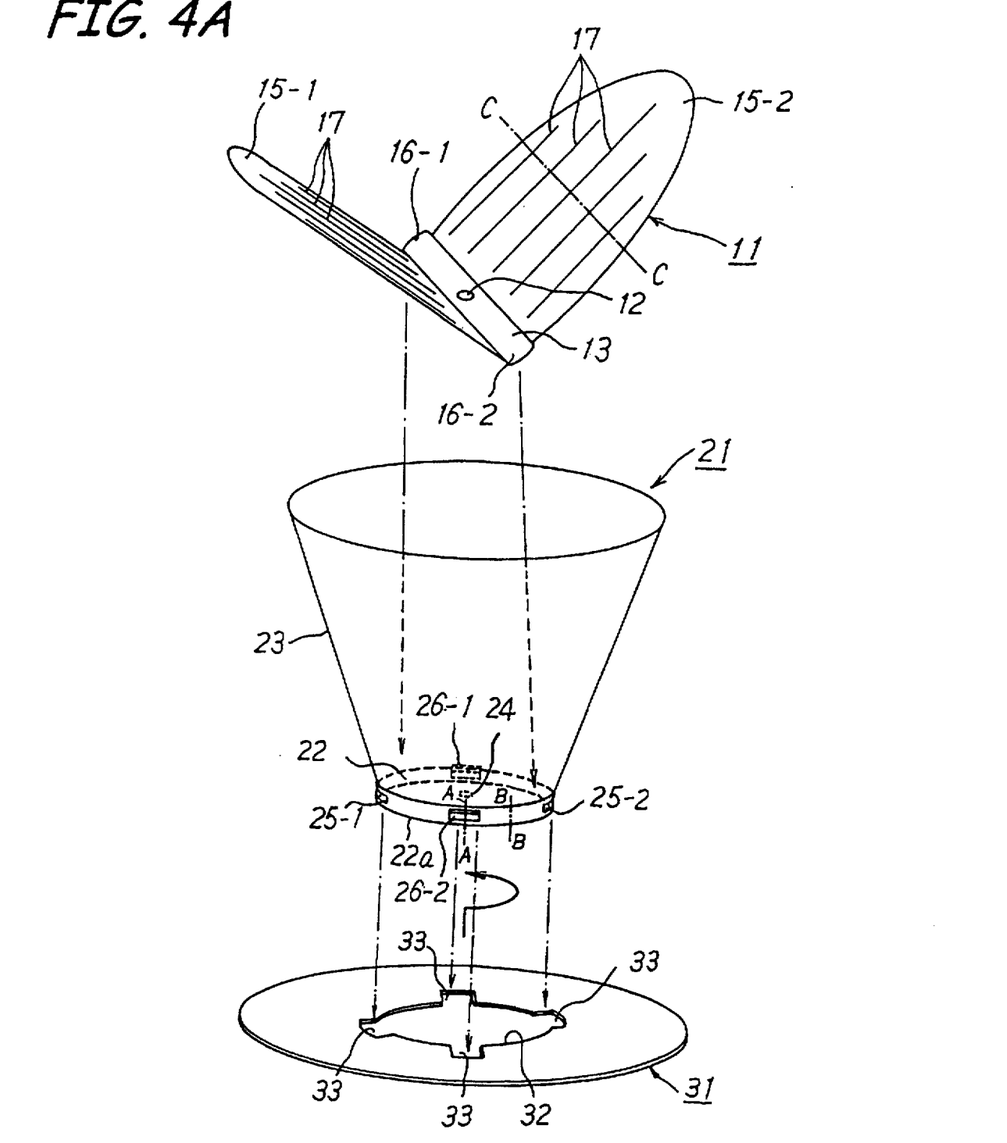
FIG. 4A is an exploded perspective view representing the dripping apparatus for liquids according to the present invention, which is shown in FIGS. 1 to 3.
Figure 4B:
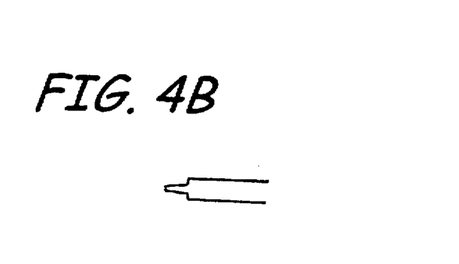
FIG. 4B is a cross-sectional view of the stand portion of the bellows member which is cut along A—A line in FIG. 4A.
Figure 4C:
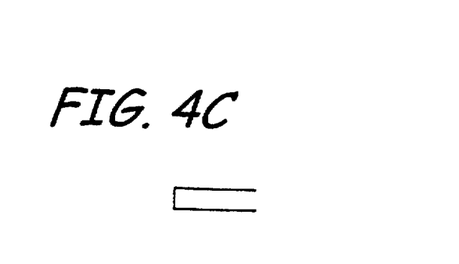
FIG. 4C is a cross-sectional view of the stand portion of the bellows member which is cut along B—B line in FIG. 4A.

FIGS. 1 to 3 are schematic views showing a first embodiment of the dripping apparatus for liquids according to the present invention; FIG. 1 is a plan view, FIG. 2 is a front view and FIG. 3 is a side view of the dripping apparatus for liquids, respectively. Additionally, FIG. 4 is an exploded perspective view of the dripping apparatus for liquids according to the present invention. It should be noted that an apparatus for dripping coffee liquid is explained in the below-mentioned embodiment. As shown in FIGS. 1 to 4, the dripping apparatus for liquids 1 according to the present invention is constituted of a filter holding member 11, a bellows member 21 and a supporting brim 31. The material for each member is not limited specially. However, LUMIRROR (a polyester film sold by Toray Industries, Inc.) can be preferably used for the material of the filter holding member 11, polypropylene is for the bellows member 21 and vinyl chloride is used for the supporting brim member 31.

The filter holding member 11 is provided for supporting a filter having a fan-like shape during when coffee liquid is being dripped out. The filter holding member 11 comprises a base 13 and a pair of wing members 15-1, 15-2. The base has a longitudinal square shape and a hole 12 is formed in the center of the base to drip the coffee liquid out. The wing members 15-1, 15-2 are provided both longitudinal sides of the base 13. The wing members 15-1 and 15-2 are arranged to be foldable with respect to the base 13 along the side lines 14-1, 14-2 thereof, respectively. On the shorter sides of the base 13, along which no wing member is provided, there are provided protrusions 16-1, 16-2, respectively. Each of the wing members 15-1, 15-2 consists of a plate member, on the surface of which a plurality of long and slender protrusions 17 are formed in an extended direction of the wing members. These protrusions 17 function to make the strength of the filter holding member 11 high and prevent that the filter is adhered on the surface of the wing members 15-1 and 15-2 during when the coffee liquid is being dripped out, therefore making it easy to drip the coffee liquid.

The bellows member 21 is provided for holding the filter holding member 11 inside thereof, making a space to hold the filter. The bellows member 21 is comprised of a bottom portion 22 and a bellows portion 23 which can be prolonged from the bottom portion 22 to the upper direction. In the bottom portion 22, is provided a hole 24 for dripping coffee liquid. The hole 24 should be located so as to be superimposed to the hole 12, which is provided in the filter holding member 11 when the filter holding member 11 is mounted in the bellows member 21. The bellows portion 23 further comprises a stand portion 22a on which cut-out portions 25-1, 25-2 are provided so as to be opposite to each other, while there are also provided protrusions 26-1, 26-2 being positioned forming about 90 degrees with respect to the cut-out portions 25-1, 25-2, respectively. The protrusions 16-1 and 16-2 provided on the base 13 of the filter holding member 11 are engaged into the cut out portions 25-1, 25-2 of the stand portion 22a of the bellows member 21, respectively, from inside to outside; the thus engaged protrusions 16-1 and 16-2 and the pair of protrusions 26-1, 26-2 provided on the stand portion 22a of the bellows member 21 are further mounted to the supporting brim member 31, so as to be assembled together to complete the coffee dripping apparatus. Furthermore, there is provided a fringe 21a on the top end portion of the bellows member 21, the fringe 21a is protruded inside so that the top end portions 15-1a, 15-2a of the wing members 15-1, 15-2 can be engaged to the fringe 21a of the bellows member 21 when the bellows member 21 is prolonged to be used as the coffee dripping apparatus.

In this embodiment, the fringe 21a is formed on the upper end portion of the bellows member 21 in order to engage the top end portion of the wing members 15-1, 15-2 there. However, an alternative can be considered, which is to make the height of the bellows portion enough long so that the top end portion of the wing members 15-1 and 15-2 are engaged with a first lip portion of the bellows from the top in the bellows member 21.

The supporting brim 31 is provided for mounting the coffee dripping apparatus as a whole on an opening of a container for dripped coffee liquid, i.e. coffee cup or coffee pot, in a stable manner. The supporting brim 31 has an opening 32 in the center portion thereof. Along the opening 32, four cut-off portions 33 are provided at 90 degrees to each other as illustrated in FIG. 4A. Into the cut-off portions 33, the protrusions 16-1 and 16-2 which are provided on the base 13 of the filter holding member 11, (which are protruded from the holes 25-1, 25-2 provided on the stand portion 22a of the bellows member 21) and the protrusions 26-1, 26-2 provided on the stand portion 22a of the bellows member 21 are inserted, respectively; then the filter holding member 11 and the bellows member 21 are rotated by a predetermined angle, for instance, 45 degrees, with respect to the supporting brim member 31 so that the bellows member 21, the filter holding member 11 can be secured to the supporting brim member 31.

In this case, the protrusions 16-1 and 16-2 of the base 13 of the filter holding member 11 are inserted into the cut-off portions 33 after being inserted through the holes 25-1, 25-2 of the bellows member 21. Therefore, the filter holding member 11 is engaged to the supporting brim member 31 more tightly, and thus the filter holding member 11, the bellows member 21 and the supporting brim member 31 can be assembled together in a stable manner by the tight engagement of the members 11 and 31. In order to disassemble the filter holding member 11 and the bellows member 21 from the supporting brim member 31, the reverse actions are required.

Figure 5A:
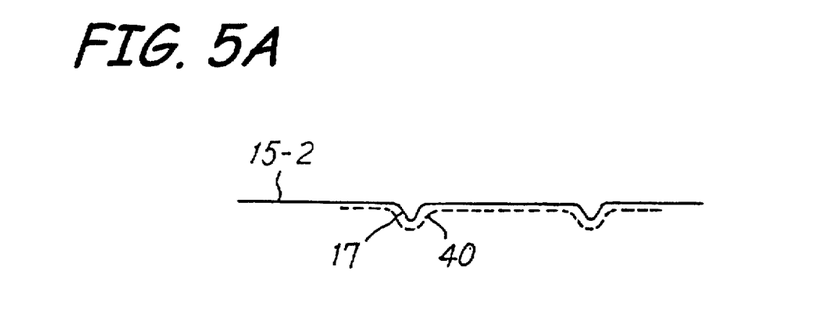
FIG. 5A is a cross-sectional view of the wing members of the filter holding member, cut along C—C line in FIG. 4A.
Figure 5B:
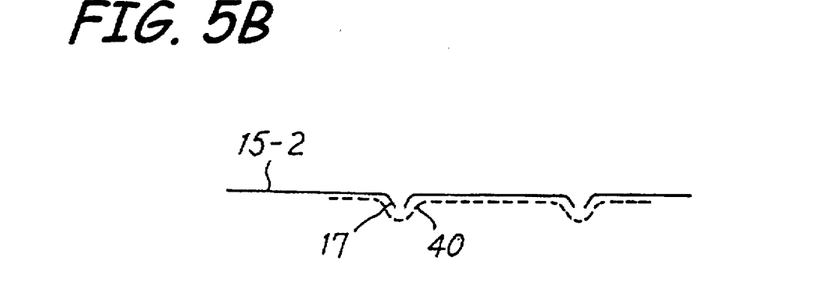
FIG. 5B is a cross-sectional view of a modified construction of the wing members.

FIG. 5A is a cross-sectional view of the wing member 15-2 of the filter holding member 11 which is cut along Line C—C in FIG. 4A, showing a cross-sectional shape of the protrusions 17 provided on the surface of the wing member 15-2. Each protrusion 17 has its height of about 0.5 to 2 mm and a filter 40 is supported by the tip portions of these protrusions 17. According to such a construction, the problem can be solved that the filter absorbs moisture during when dripping coffee liquid, the filter adheres to the surface of the holding member 11, and then it becomes difficult to drip the coffee liquid because no space is formed between the filter 40 and the surface of the filter holding member through which the coffee liquid slip down. In this embodiment, the tip portions of the protrusions 17 are so designed that they are extended along the longitudinal direction of the wing members 15-1, 15-2 and are continued in a width (cross) direction of the wing members. However, as shown in FIG. 5B, it may be possible to arrange to cut the tip portions of the protrusions 17 along the longitudinal direction of the wing members 15-1, 15-2 so as to discontinue the tip portions in a width (cross) direction of the wing members 11. According to such an arrangement, the coffee liquid is also dripped out from the cut-off portions, so that it becomes much more easier to drip the coffee liquid out.

Instead of cutting off the tip portions of the protrusions 17 along the extending direction thereof, it may be possible to form a plurality of small holes in the tip portions of the protrusions 17 along with the extending direction thereof.

Figure 6:
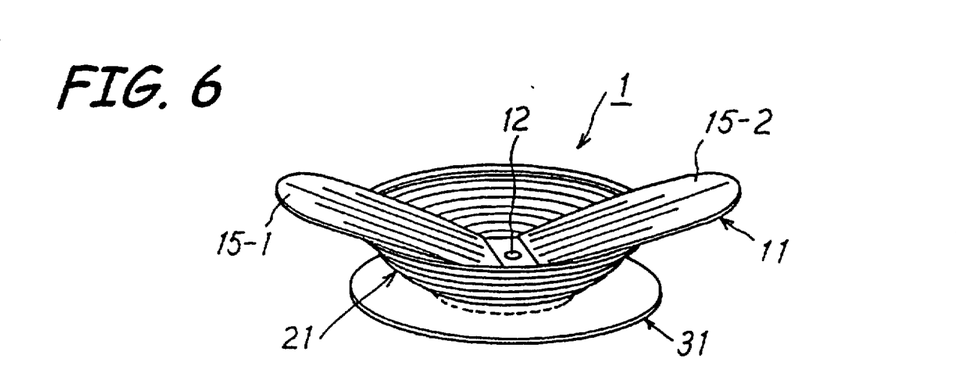
FIG. 6 is a perspective view showing a condition that the dripping apparatus for liquids according to the present invention is folded.
Figure 7:
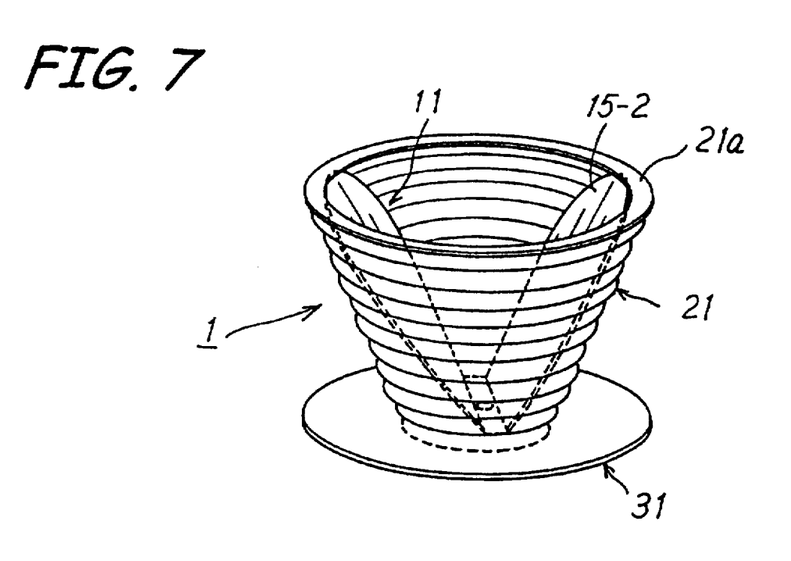
FIG. 7 is a perspective view depicting a condition that the dripping apparatus for liquids according to the present invention is assembled.

In FIGS. 1 to 3, the condition that the bellows member 21 is prolonged in order to be practically used as a coffee dripping apparatus is shown by a solid line, while the condition that the bellows member 21 is folded and the filter holding member 11 is opened is indicated by a broken line. For reference, a perspective view illustrating the condition that the bellows member 21 is folded and that the filter holding member 11 is opened is provided in FIG. 6; and a perspective view representing the condition that the bellows member 21 is prolonged and that the upper end portion of the filter holding member 11 is engaged to the upper portion (fringe portion 21a) of the bellows 21 is shown in FIG. 6.

As stated above, the coffee dripping apparatus 1 according to the invention is arranged such that the filter holding member 11 and the bellows member 21 are detachable to the supporting brim member 31; therefore, when storing or carrying the coffee dripping apparatus 1, the apparatus can be disassembled into pieces.

When using the coffee dripping apparatus 1, these members are assembled together; for instance, a paper filter, which is widely available on the market, is set in the space formed by the bellows member 21 and the wing members 15-1 and 15-2, some ground coffee beans are put in the filter and then boiled water is poured there, then coffee liquid drops out through the holes 12 and 24; and then a liquid coffee can be obtained. The apparatus 1 can be folded to obtain a flat shape thereof, so it is convenient to store or carry it anywhere. Further, the members constituting the apparatus can be assembled together very easily, so that people can enjoy the taste of regular coffee even outside.

Figure 8A:
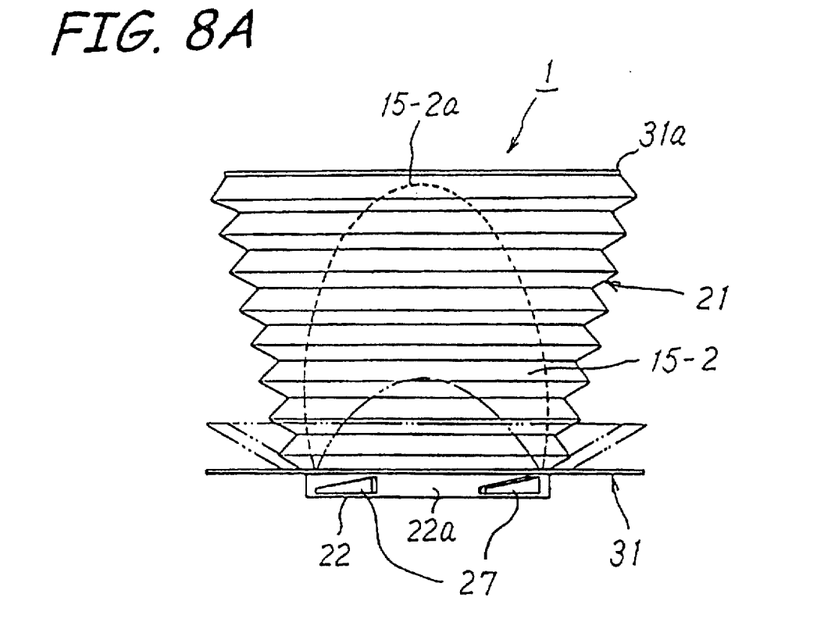
FIG. 8A is a side view and FIG. 8B is a bottom view, which are illustrating a construction of the bellows member of a second embodiment of the apparatus for dripping liquids according to the present invention.
Figure 8B:
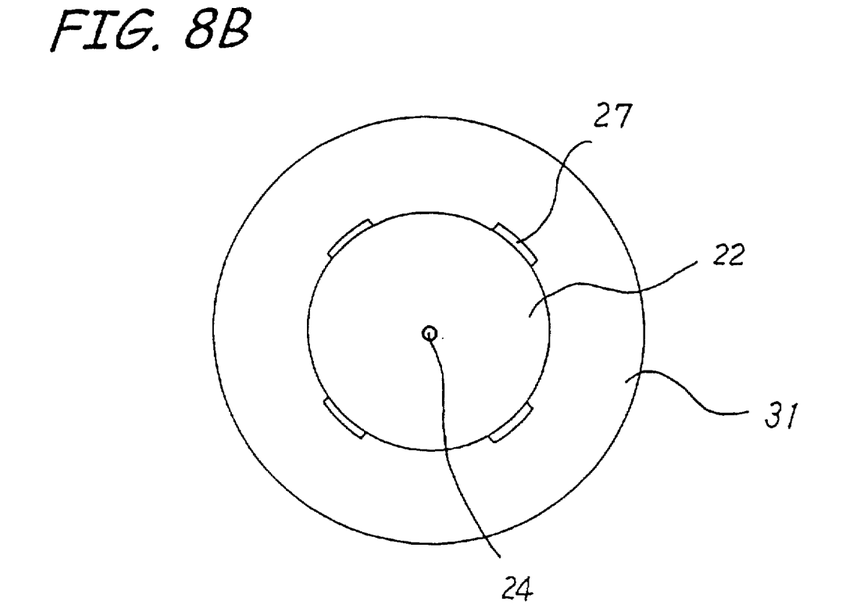

FIG. 8A is a side view and FIG. 8B is a bottom view, which are showing the construction of the bellows member 21 of the second embodiment of the apparatus for dripping liquids according to the present invention, where the securing means for securing the filter holding member 11 and the bellows member 21 to the supporting brim member 31 is modified. As shown in FIG. 8, in the second embodiment, four protrusions 27 are provided around the stand portions 22a of the bellows member 21 so as to form 90 degrees to each other. The insides of the protrusions 27 are concave so that the protrusions 16-1, 16-2 of the base 13 of the filter holding member 11 can be inserted therein. According to such a construction, the number of manufacturing steps of the bellows member 11 becomes simpler because the step for making the cut out portions 25-1, 25-2 in the first embodiment is not necessary any more. Further, the protrusions 16-1, 16-2 of the base 13 of the filter holding member 11 can be inserted into any pair of the concave portions (corresponding to the protrusions 27), so that the assembling procedure of the apparatus becomes easier.

As shown in FIG. 8A, it is preferred to make the shape of the protrusions 27 tapered so that it becomes easier to rotate the filter holding member 11 and the bellows member 21 with respect to the supporting brim member 31 to complete the assembly thereof.

Further, it should be noted that it may be possible to provide two or more holes in the base 13 of the filter holding member 11 and the bottom portion 22 of the bellows member 21 in a superimposed manner to drip the liquid out instead of only one.

As explained above, the coffee dripping apparatus according to the present invention is so designed so as to be collapsible by using a bellows material; during when the apparatus is not being used, it can be stored without occupying a large space or transported more easily. Further, according to the invention, a paper or other material filter which is widely available on the market can be used in the space formed by the bellows member 21 and the filter holding member 11, so that fresh ground coffee powder can be always used to obtain liquid coffee. It means, the problem of conventional instant dripping sets can be solved where the quality of the ground coffee powder, which has been preliminarily contained therein, deteriorates after a significant time has passed. Furthermore, according to the invention, since the top portions of the wing members can be engaged with the end portion of the bellows member, even if hot water is poured into the space formed by the bellows member, the bellows member does not shrink anymore, so that the safety when boiled water is poured into the space formed by the bellow member can be improved.

What is claimed is:

1. A dripping apparatus for liquids comprising:
    a filter holding member comprising a base having a pair of longitudinal sides, where at least one hole is provided for dripping liquids out and a pair of wing members being provided on both longitudinal sides of said base, said wing members being arranged to be collapsible along lines which connect said base and said wing members together;
    a bellows member comprising a bottom portion where at least one hole is provided for dripping liquids out so as to be superimposed to said hole provided in said base of the filter holding member when said filter holding member is mounted inside of the bellows member, a bellows portion being arranged to be able to be prolonged, and a stand portion being provided under said bottom portion;
    a supporting brim member having an opening in a center portion thereof for supporting said filter holding member and said bellows member in a detachable manner; and
    a securing means for securing said filter holding member, said bellows member and said supporting brim member altogether to assemble the apparatus as a whole.

2. A dripping apparatus for liquids according to claim 1, wherein said base further includes a pair of shorter sides, said filter holding member comprises first protrusions on both shorter sides of said base; said bellows member comprises receiving portions for receiving said first protrusions provided on said base when the apparatus is assembled and second protrusions; and said supporting brim member comprises cut-off portions around the opening thereof so as to correspond to said receiving portions and second protrusions provided on the stand portion of the bellows member; and wherein said securing means consists of the first protrusions provided on the base of said filter holding member, the receiving portions and the second protrusions provided on the stand portion of the bellows member, and the cut-off portions provided around the opening of the supporting brim member;

whereby the filter holding member, the bellows member and the supporting brim member are assembled together in such a manner that the first protrusions of the base are inserted into the receiving portions of the stand portion; the second protrusions of the stand portion and the receiving portions into which said first protrusions are inserted are inserted into said cut-off portions of the supporting brim member; and then the filter holding member and the bellows member, which are combined together, are rotated by given degrees to complete the assembly of the members together.

3. A dripping apparatus for liquids according to claim 1 or 2, wherein said bellows member comprises a fringe portion on a top end portion thereof so that top end portions of said wing members can be engaged with said fringe portion of said bellows member.

4. A dripping apparatus for liquids according to claim 1 or 2, wherein said bellows member has enough height so that top end portions of said wing members can be engaged with a first lip portion of said bellows portion from an upper side.

5. A dripping apparatus for liquids according to claim 1 or 2, wherein a plurality of long and slender protrusions are provided on surfaces of said wing members of the filter holding member in an extending direction of the wing members.

6. A dripping apparatus for liquids according to claim 5, wherein tip portions of said plurality of long and slender protrusions are continued in a traverse direction of the long and slender protrusions.

7. A dripping apparatus for liquids according to claim 5, wherein tip portions of said plurality of long and slender protrusions are cut off along an extending direction of the long and slender protrusions.

* * * * *